United States Patent [19]
Gautier

[11] Patent Number: 4,719,842
[45] Date of Patent: Jan. 19, 1988

[54] BRAKE BOOSTER WITH A DOUBLE PRESSURE DISK

[75] Inventor: Jean-Pierre Gautier, Aulnay-sous-Bois, France

[73] Assignee: Bendix France S.A., Paris, France

[21] Appl. No.: 803

[22] Filed: Jan. 6, 1987

[30] Foreign Application Priority Data

Jan. 8, 1986 [FR] France ................... 86 00165

[51] Int. Cl.⁴ .................................... F15B 9/10
[52] U.S. Cl. ........................... 91/369 A; 91/376 R
[58] Field of Search ................... 91/369 A, 376 R

[56] References Cited
U.S. PATENT DOCUMENTS
3,035,551 5/1962 Rike .
3,146,679 9/1964 Ayers, Jr. .
4,587,885 5/1986 Boehm ................... 91/369 A FOREIGN PATENT DOCUMENTS
0014146 8/1980 European Pat. Off. .

Primary Examiner—Robert G. Nilson
Attorney, Agent, or Firm—Larry J. Palguta; Ken C. Decker

[57] ABSTRACT

Two pressure disks (13, 19) are arranged in tandem between the valve plunger (9) and the rear end (21) of the booster output rod (22), a stepped middle member (23), having a front portion with a reduced diameter (24) sliding inside an annular spacer member (17), being arranged between the two pressure disks and cooperating with the latter.

7 Claims, 1 Drawing Figure

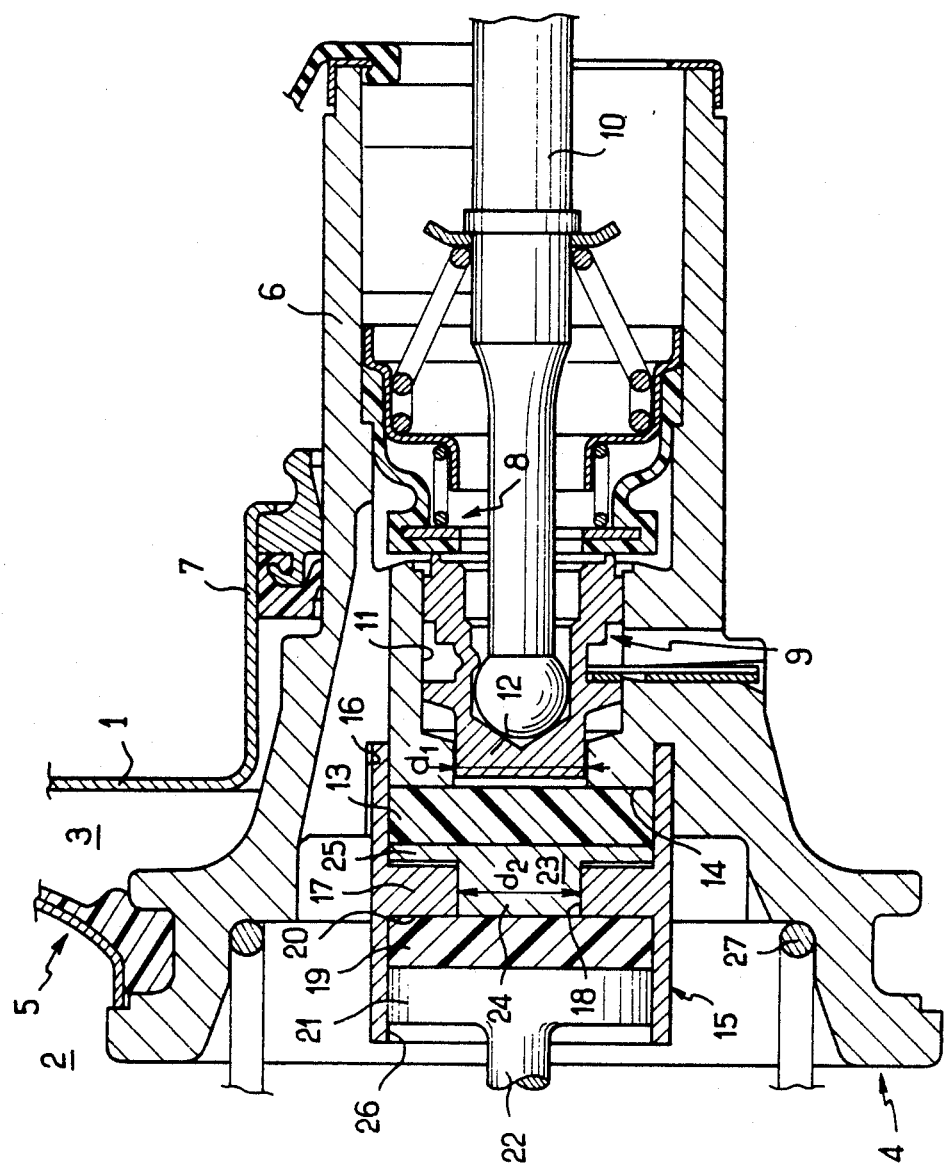

BRAKE BOOSTER WITH A DOUBLE PRESSURE DISK

The present invention concerns brake boosters of the type comprising: a booster piston coupled to an output rod, which is intended to be connected to a brake master-cylinder piston, and containing a distribution valve means actuated by a valve plunger connected to a booster input rod intended to be connected to a vehicle brake pedal, and a pressure disk which is confined peripherally and arranged between the rear end of the output rod, on the one hand, and the front end of of the plunger and a peripheral annular central shoulder of the booster piston, on the other hand.

A brake booster of this type is described in the document U.S. Pat. No. 3,110,031. In conventional boosters of this type, the pressure disk, which is typically made of elastomeric material, is directly arranged between the rear, generally enlarged end of the output rod and the front end of the plunger, which generally has a reduced diameter, the counterpressure exerted on the input rod, via the valve plunger, when the booster is operated in order to actuate a master cylinder associated with the latter, being determined by the respective cross-sections of the rear end of the rod (and the pressure disk) and of the front end of the valve plunger, which generally have a ratio of about 2.5:1.

It is an object of the present invention to provide improvements to boosters of this type, permitting increased sensitivity when the booster is operated and consequently making it possible to reduce considerably the leverage of the brake actuating pedal and, therefore, the travel of the latter, by means of a simple, robust and reliable arrangement which involves only very minimal extra manufacturing and assembly costs and can be adapted to any type of existing booster with a pressure disk.

To this end, according to a feature of the invention, the booster comprises a second pressure disk which is confined peripherally and co-operates with the rear end of the output rod, and a stepped middle member arranged between the two pressure disks and co-operating with the latter.

According to another feature of the invention, the middle member has a front portion with a reduced diameter slidably extending inside a central bore of an annular spacer member forming a peripheral shoulder cooperating, with the front end of the middle member portion of reduced diameter, with the rear face of the second disk.

With such an arrangement, the sensitivity ratio of the booster becomes the product of the ratios between the cross-sections of the second disk and the front end of the middle member portion with a reduced diameter, on the one hand, and of the first disk and the front end of the valve plunger, on the other hand.

The invention will now be described by way of example with reference to the accompanying drawing in which:

the sole FIGURE is a schematic longitudinal section of the rear central part of a brake booster according to the invention.

In the following description and the claims, the expressions "front" and "rear" relate to the general orientation of a vehicle in which the booster is installed, the "front" thus corresponding to the left-hand side of the sole FIGURE and the "rear" to the right-hand side of the FIGURE.

The sole FIGURE shows the rear central part of a pneumatic brake booster comprising a housing, a portion of the rear shell 1 of which can be seen and which is divided internally into a front chamber, or vacuum chamber 2, and a rear chamber, or working chamber 3, by a booster piston comprising a central hub part 4 and a peripheral diaphragm means 5. The central hub part 4 has a rear tubular part 6 with a reduced diameter sliding inside a rear duct 7 of the housing and containing a distribution valve means, indicated generally by the reference number 8, which is actuated by a valve plunger 9 coupled to the end of an input rod 10 connected, at its other end, to a vehicle brake pedal (not shown). The valve plunger 9 slides inside a central stepped bore 11 of the hub part 4 and has a front end portion 12 with a reduced diameter $d_1$ intended to co-operate, when the booster is operated, with a first pressure disk 13 which is typically made of elastomeric material and is supported in the hub part 4 and has a diameter greater than the diameter $d_1$, the rear annular peripheral portion of the first disk 13 bearing against an annular central shoulder 14 of the part of the hub 4 surrounding, coaxially, the front end 12 of the valve plunger 9.

According to the invention, the first disk 13 is confined peripherally inside a tubular cage 15 accommodated in an annular groove 16 in the central hub part 4 and having an annular spacer member 17 extending radially inwards, which member is formed advantageously as a single metal part with the cage 15 and defines a central bore 18 with a diameter $d_2$ advantageously less than the diameter $d_1$.

Inside the cage 15 there is also confined peripherally a second pressure disk 19 which is also made of elastomeric material and the peripheral annular portion of the rear face of which is in contact against the front annular face 20 of the annular spacer member 17 and the front face of which bears against an enlarged end part 21 (having the same diameter as that of the second disk 19) of an output rod 22 of the booster, which rod is intended typically to be coupled to a main piston of a brake master cylinder (not shown). According to a feature of the invention, there is arranged between the two disks 13 and 19 a middle member, indicated generally by the reference number 23, which comrpises a front portion with a reduced diameter 24 which is slidably mounted inside the bore 18 of the annular spacer member 17 and the front end of which is intended to co-operate with the central portion of the rear face of the second disk 19, and a rear part (25) which has an enlarged diameter substantially equal to that of the first disk 13 and the rear face of which is intended to co-operate with the front face of the first disk 13. In the embodiment shown, the cage 15 advantageously defines, on either side of the spacer member 17, a bore with a constant diameter 26 inside which are accommodated the rear end 21 of the output rod 22, the two disks 19 and 13, which are advantageously identical, and the rear part 25 of the middle member 23.

In the position, shown in the sole FIGURE, where the booster is at rest and where the booster piston 4,5 is positioned in the vicinity of the rear shell 1 of the booster housing by a piston return spring 27 arranged inside the vacuum chamber 2, the front end of the front portion with a reduced diameter 12 of the valve plunger 9 is set back slightly from the rear face of the first disk 13 in contact, moreover, against the annular central shoulder 14, the output rod 22, biased by the master-cylinder piston return spring, pressing, with its enlarged rear end 21, the second pressure disk 19 against the front annular shoulder 20 of the spacer member 17 and against the front end of the front portion with a reduced diameter 24 of the middle member 23, the rear face of which is in contact with the front face of the first disk 13. In this case, provision will advantageously be made for there to be slight play between the annular front face of the rear part with an enlarged diameter 25 of the middle member 23 and the adjacent rear annular face of the middle member 17.

Operation of the booster according to the invention is in all respects identical to that of conventional boosters except that, when the booster is operated and the valve plunger 9 is moved forwards in order to actuate the distribution valve means 8, and its front end 12 thus bears against the central part of the first disk 13, the counterpressure transmitted from the output rod 22 to the valve plunger 9 is, as mentioned above, the product of the ratio between the sections of the second disk 19 and the front portion with a reduced diameter 25 of the middle member 23, on the one hand, and the ratio between the sections of the first disk 13 and the portion of the front end 12 of the valve plunger 9, on the other hand, thereby increasing considerably the sensitivity ratio of the booster without affecting the operation, precisely adjusted moreover, of the valve means 8 and the associated valve plunger 9. The ratio between the cross-sections of the first disk 13 and the front portion with a reduced diameter 12 of the valve plunger 9 is typically about 2.5:1, the ratio between the cross-sections of the second disk 19 and the front portion with a reduced diameter 24 of the middle member 23 being greater than 2.5:1 and less than 5:1 and typically of the order of 4.5:1, so as to provide an overall ratio of about 11:1.

Although the present invention has been described in relation to a particular embodiment, it is not limited thereto, but, on the contrary, may be subject to modifications and variations deemed necessary by a person skilled in the art. In particular, both the radial and axial dimensions of the disks, the middle member 23, the spacer member 17 and the rear end 21 of the output rod 22 may be adapted, depending on the types of boosters and the types of associated brake systems.

I claim:

1. A brake booster comprising: a booster piston coupled to an output rod and containing distribution valve means actuated by a valve plunger connected to an input rod of the booster, and a pressure disk which is confined peripherally and arranged between a rear end of the output rod, and a front end of the valve plunger and a peripheral annular central shoulder of the booster piston, characterized in that the booster comprises a second pressure disk which is confined peripherally and co-operates with the rear end of the output rod, and a stepped middle member arranged between the two pressure disks and co-operating with the disk.

2. The booster according to claim 1, characterized in that the middle member has a front portion with a reduced diameter slidably extending inside a central bore of an annular spacer member forming a front peripheral shoulder co-operating with a rear face of the second disk.

3. The booster according to claim 2, characterized in that the middle member comprises a rear portion which has a diameter substantially equal to that of the first disk and co-operates with a front face of the front disk.

4. The booster according to claim 3, characterized in that the annular spacer member is integral with a tubular cage which is supported on the booster piston and inside which the two disks are confined peripherally.

5. The booster according to claim 4, characterized in that the two disks are substantially identical.

6. The booster according to claim 5, characterized in that the front portion of the middle member has a cross-section less than that of the front end of the valve plunger.

7. The booster according to claim 6, characterized in that a ratio between the cross-sections of the front portion of the middle member and the second disk is not greater than 5:1.

* * * * *